(12) United States Patent
Hosseini et al.

(10) Patent No.: US 11,528,703 B2
(45) Date of Patent: Dec. 13, 2022

(54) MIXED CAPABILITY SIGNALING FOR SUPPORTING OUT OF ORDER OPERATIONS

(71) Applicant: QUALCOMM Incorporated, San Diego, CA (US)

(72) Inventors: Seyedkianoush Hosseini, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 15/930,420

(22) Filed: May 12, 2020

(65) Prior Publication Data

US 2020/0367241 A1 Nov. 19, 2020

Related U.S. Application Data

(60) Provisional application No. 62/847,263, filed on May 13, 2019.

(51) Int. Cl.
*H04W 72/10* (2009.01)
*H04W 72/12* (2009.01)
(Continued)

(52) U.S. Cl.
CPC ......... *H04W 72/0453* (2013.01); *H04W 8/24* (2013.01); *H04W 72/042* (2013.01); *H04W 72/10* (2013.01)

(58) Field of Classification Search
CPC ....... H04L 41/22; H04L 5/0055; H04L 5/001; H04W 4/46; H04W 52/146; H04W 72/0446; H04W 72/0453; H04W 72/10
(Continued)

(56) References Cited

U.S. PATENT DOCUMENTS

2012/0113866 A1 5/2012 Tenny et al.
2014/0307597 A1* 10/2014 Kim ...................... H04L 5/1469
370/280

(Continued)

FOREIGN PATENT DOCUMENTS

EP 2528401 A1 11/2012
WO WO-2019032285 A1 2/2019

OTHER PUBLICATIONS

International Search Report and Written Opinion—PCT/US2020/032609—ISA/EPO—dated Jul. 29, 2020.

*Primary Examiner* — Khaled M Kassim
*Assistant Examiner* — Jason A Harley
(74) *Attorney, Agent, or Firm* — Holland & Hart LLP

(57) ABSTRACT

Methods, systems, and devices for wireless communications are described. Generally, the described techniques provide for identifying one or more bands of a band combination, determining whether the user equipment (UE) is configured with a capability associated with the one or more bands to support a first component carrier for a first priority of service, support a second component carrier for a second priority of service, and process one or more channels associated with the first priority of service and the second priority of service on a component carrier. The UE may transmit the capability to support one or more component carriers for at least one of the first priority of service or the second priority of service and process the one or more channels on the component carrier, and receive a configuration for the one or more component carriers.

30 Claims, 10 Drawing Sheets

(51) Int. Cl.
    *H04B 7/06*           (2006.01)
    *H04B 7/08*           (2006.01)
    *H04W 8/24*          (2009.01)
    *H04W 72/04*        (2009.01)

(58) Field of Classification Search
    USPC .......................................................... 370/252
    See application file for complete search history.

(56) References Cited

U.S. PATENT DOCUMENTS

| | | | |
|---|---|---|---|
| 2015/0334765 A1* | 11/2015 | Rahman | H04L 5/001 370/328 |
| 2017/0238316 A1 | 8/2017 | Li et al. | |
| 2018/0270824 A1 | 9/2018 | Jung et al. | |
| 2019/0191429 A1* | 6/2019 | Stern-Berkowitz | H04W 72/085 |
| 2020/0329832 A1* | 10/2020 | Wang | H04W 28/065 |
| 2021/0223354 A1* | 7/2021 | Breuer | G01S 5/02216 |

\* cited by examiner

MIXED CAPABILITY SIGNALING FOR SUPPORTING OUT OF ORDER OPERATIONS

CROSS REFERENCE

The present Application for Patent claims the benefit of U.S. Provisional Patent Application No. 62/847,263 by HOSSEINI et al., entitled "MIXED CAPABILITY SIGNALING FOR SUPPORTING OUT OF ORDER OPERATIONS," filed May 13, 2019, assigned to the assignee hereof, and expressly incorporated by reference herein.

BACKGROUND

The following relates generally to wireless communications, and more specifically to mixed capability signaling for supporting out of order operations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support mixed capability signaling for supporting out of order operations. Generally, the described techniques provide for identifying one or more bands (e.g., associated with a band combination), determining whether a user equipment (UE) is configured with a capability associated with the one or more bands to: support a first component carrier for a first priority of service, support a second component carrier for a second priority of service, and process one or more channels associated with the first priority of service and the second priority of service on a component carrier. The techniques also may provide for transmitting the capability to support one or more component carriers for at least one of the first priority of service or the second priority of service and process the one or more channels associated with the first priority of service and the second priority of service on the component carrier, or receiving a configuration for at least one of the one or more component carriers.

A method of wireless communication at a UE is described. The method may include identifying one or more bands (e.g., associated with a band combination), determining whether the UE is configured with a capability associated with the one or more bands to support a first component carrier for a first priority of service, support a second component carrier for a second priority of service, and process one or more channels associated with the first priority of service and the second priority of service on a component carrier. The method may include transmitting, to a base station based on the determining, the capability to support one or more component carriers for at least one of the first priority of service or the second priority of service and process the one or more channels associated with the first priority of service and the second priority of service on the component carrier, and receiving, from the base station based on the transmitting, a configuration for at least one of the one or more component carriers.

An apparatus for wireless communication at a UE is described. The apparatus may include a processor, memory in electronic communication with the processor, and instructions stored in the memory. The instructions may be executable by the processor to cause the apparatus to identify one or more bands (e.g., associated with a band combination), determine whether the UE is configured with a capability associated with the one or more bands to support a first component carrier for a first priority of service, support a second component carrier for a second priority of service, and process one or more channels associated with the first priority of service and the second priority of service on a component carrier. The instructions may be executable by the processor to cause the apparatus to transmit, to a base station based on the determining, the capability to support one or more component carriers for at least one of the first priority of service or the second priority of service and process the one or more channels associated with the first priority of service and the second priority of service on the component carrier, and receive, from the base station based on the transmitting, a configuration for at least one of the one or more component carriers.

Another apparatus for wireless communication at a UE is described. The apparatus may include means for identifying one or more bands (e.g., associated with a band combination), determining whether the UE is configured with a capability associated with the one or more bands to support a first component carrier for a first priority of service, support a second component carrier for a second priority of service, and process one or more channels associated with the first priority of service and the second priority of service on a component carrier. The apparatus may include means for transmitting, to a base station based on the determining, the capability to support one or more component carriers for at least one of the first priority of service or the second priority of service and process the one or more channels associated with the first priority of service and the second priority of service on the component carrier, and receiving, from the base station based on the transmitting, a configuration for at least one of the one or more component carriers.

A non-transitory computer-readable medium storing code for wireless communication at a UE is described. The code may include instructions executable by a processor to identify one or more bands (e.g., associated with a band combination), determine whether the UE is configured with a capability associated with the one or more bands to support a first component carrier for a first priority of service, support a second component carrier for a second priority of service, and process one or more channels associated with the first priority of service and the second priority of service on a component carrier. The code may include instructions executable by the processor to transmit, to a base station based on the determining, the capability to support one or more component carriers for at least one of the first priority of service or the second priority of service and process the one or more channels associated with the first priority of service and the second priority of service on the component carrier, and receive, from the base station based on the transmitting, a configuration for at least one of the one or more component carriers.

In some examples of the method, apparatuses, and non-transitory computer-readable medium described herein, transmitting the capability of the UE further may include operations, features, means, or instructions for transmitting an indication that the UE may be capable of processing the one or more channels associated with the first priority of service and the second priority of service on the component carrier.

In some examples of the method, apparatuses, and non-transitory computer-readable medium described herein, receiving the configuration for the one or more component carriers further may include operations, features, means, or instructions for receiving the configuration indicating that one or more channels associated with the first priority of service and the second priority of service may be configured on the component carrier.

In some examples of the method, apparatuses, and non-transitory computer-readable medium described herein, receiving the configuration for the one or more component carriers further may include operations, features, means, or instructions for receiving the configuration indicating that one or more channels associated with the first priority of service and the second priority of service may be configured on different component carriers of the one or more component carriers.

In some examples of the method, apparatuses, and non-transitory computer-readable medium described herein, transmitting the capability of the UE further may include operations, features, means, or instructions for transmitting an indication that the UE may be incapable of processing the one or more channels associated with the first priority of service and the second priority of service on the component carrier.

In some examples of the method, apparatuses, and non-transitory computer-readable medium described herein, receiving the configuration for the one or more component carriers further may include operations, features, means, or instructions for receiving the configuration indicating that one or more channels associated with the first priority of service may be configured on the first component carrier and one or more channels associated with the second priority of service may be configured on the second component carrier.

In some examples of the method, apparatuses, and non-transitory computer-readable medium described herein, transmitting the indication further may include operations, features, means, or instructions for transmitting an indication that the UE may be capable of receiving the configuration indicating that one or more channels associated with the first priority of service and the second priority of service may be configured on the component carrier, and that the UE may be capable of dropping the one or more channels associated with the first priority of service and processing the one or more channels associated with the second priority of service.

In some examples of the method, apparatuses, and non-transitory computer-readable medium described herein, receiving the configuration for the one or more component carriers further may include operations, features, means, or instructions for receiving the configuration indicating that one or more channels associated with the first priority of service and the second priority of service may be configured on the component carrier.

Some examples of the method, apparatuses, and non-transitory computer-readable medium described herein may further include operations, features, means, or instructions for identifying, based on the configuration, one or more priority conditions, determining, based on the identifying, whether to process the one or more channels associated with the first priority of service, and processing, based on the identifying, at least the one or more channels associated with the second priority of service.

Some examples of the method, apparatuses, and non-transitory computer-readable medium described herein may further include operations, features, means, or instructions for processing, based on the configuration, the one or more channels associated with the second priority of service, and dropping, based on the indication, the one or more channels associated with the first priority of service.

Some examples of the method, apparatuses, and non-transitory computer-readable medium described herein may further include operations, features, means, or instructions for determining whether a difference between an end of the one or more channels associated with the first priority of service and a beginning of the one or more channels associated with the second priority of services satisfies a threshold of transmission time intervals (TTIs), processing, based on determining whether the difference satisfies the threshold of TTIs, the one or more channels associated with the second priority of service, and determining, based on determining whether the difference satisfies the threshold of TTIs, to drop the one or more channels associated with the first priority of service.

Some examples of the method, apparatuses, and non-transitory computer-readable medium described herein may further include operations, features, means, or instructions for determining whether a difference between an end of the one or more channels associated with the first priority of service and a beginning of the one or more channels associated with the second priority of services satisfies a threshold of TTIs, processing, based on determining whether the difference satisfies the threshold of TTIs, the one or more channels associated with the second priority of service, and determining, based on determining whether the difference satisfies the threshold of TTIs, whether to process the one or more channels associated with the first priority of service.

In some examples of the method, apparatuses, and non-transitory computer-readable medium described herein, the threshold of TTIs may be based on a minimum processing time for the one or more channels associated with the first priority of service.

Some examples of the method, apparatuses, and non-transitory computer-readable medium described herein may further include operations, features, means, or instructions for receiving the one or more channels with the first priority of service and the one or more channels with the second priority of service and processing the one or more channels with the second priority of service prior to the one or more channels with the first priority of service, where the second priority of service has a higher priority than the first priority of service.

DETAILED DESCRIPTION

In some examples of wireless communications, a base station may serve one or more user equipments (UEs). In some examples, one or more high priority channels, one or more low priority channels, or both may be configured for a UE, which may cause out of order communications (e.g., resulting in inefficient communication). In some cases, one or more UEs may support carrier aggregation (CA), for example, to receive and process multiple channels of different priorities on a single component carrier. Additionally or alternatively, the one or more UEs may have access to orthogonal processing resources to receive and process multiple channels of different priorities. In some cases, other UEs may not be configured to receive and process multiple channels of different priorities. However, the capabilities of the UE may affect the efficiency of processing out of order signaling. Therefore, UEs may identify and report capability information (e.g., on a per band on band combination basis, on a per band of a band combination basis, or on a per band combination basis), and a base station may efficiently schedule channels of varying priorities on one or more component carriers based on one or more of the UE capabilities. The reported UE capabilities may include a number of component carriers for low priority service, a number of component carriers for high priority service, and whether a UE is capable of processing all configured channels of different priorities (e.g., without dropping a channel) in different examples, such as the example of out of order signals.

Aspects of the disclosure are initially described in the context of a wireless communications system. Aspects of the disclosure are further illustrated by and described with reference to timelines, process flows, and channel configurations. Aspects of the disclosure are further illustrated by and described with reference to apparatus diagrams, system diagrams, and flowcharts that relate to mixed capability signaling for supporting out of order operations.

Figure 1:
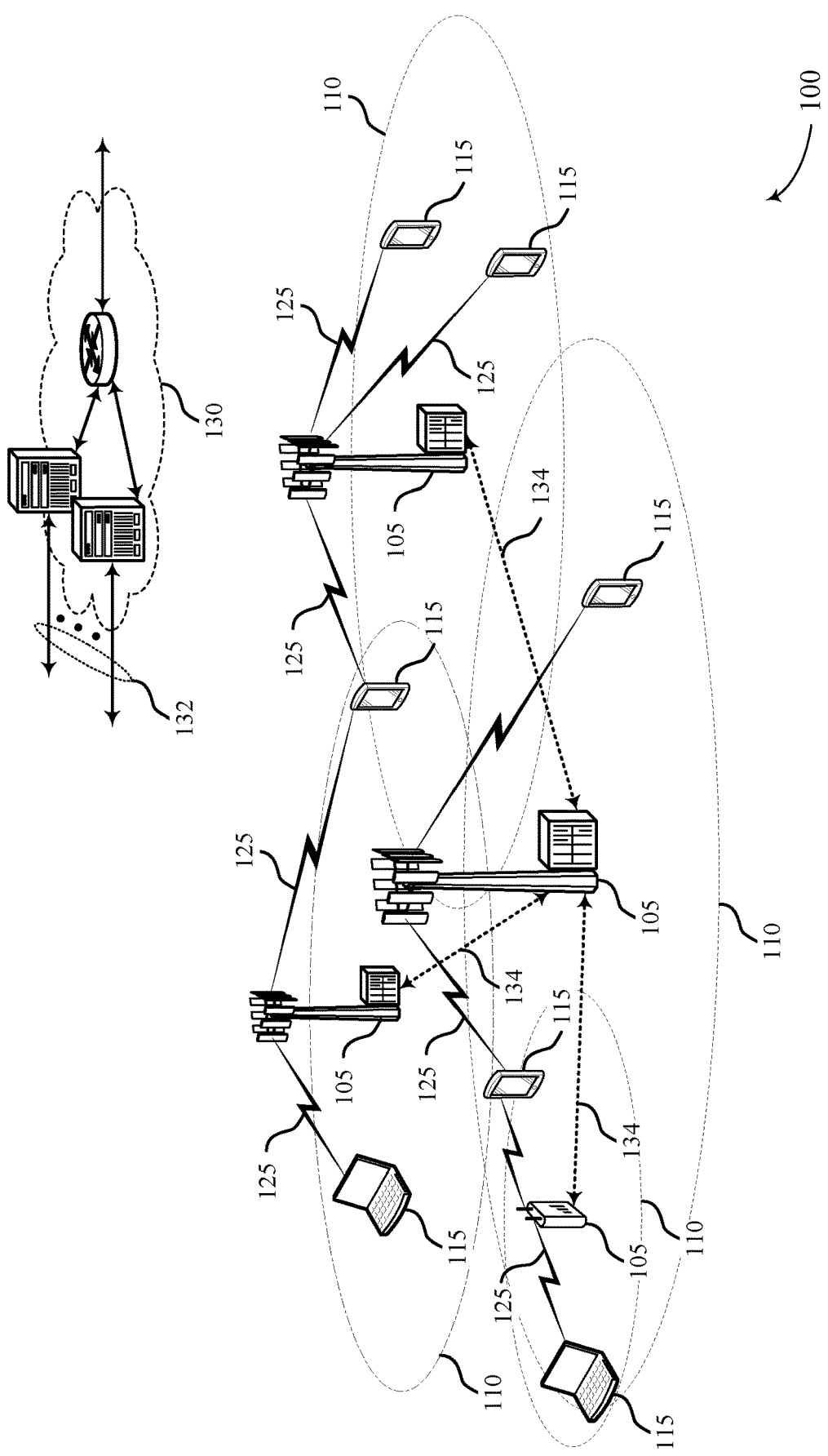
FIG. 1 illustrates an example of a system for wireless communications that supports mixed capability signaling for supporting out of order operations in accordance with aspects of the present disclosure.

FIG. 1 illustrates an example of a wireless communications system 100 that supports mixed capability signaling for supporting out of order operations in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105.

The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying an amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105, UEs 115, or both that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may be configured with a capability associated with one or more bands with a band combination. For example, the capability may allow the UE 115 to support one or more component carriers for one or more priorities of service and process one or more channels associated with the priorities of service on a component carrier. The UE 115 may transmit the capability to support one or more component carriers for the one or more priorities of service and process the one or more channels associated with the one or more priorities of service on the component carrier, and receive a configuration for at least one of the one or more component carriers. This may allow for improved system efficiency as base stations 105 may more accurately and efficiently schedule UEs 115 based on their capabilities. Additionally, techniques described herein may allow UEs 115 to indicate which type of scheduling will be efficient or cost effective. A base station 105 may additionally save resources or computational overhead by permitting some UEs 115 with a set of capabilities to make their own determinations regarding out of order signaling, and more.

Figure 2:
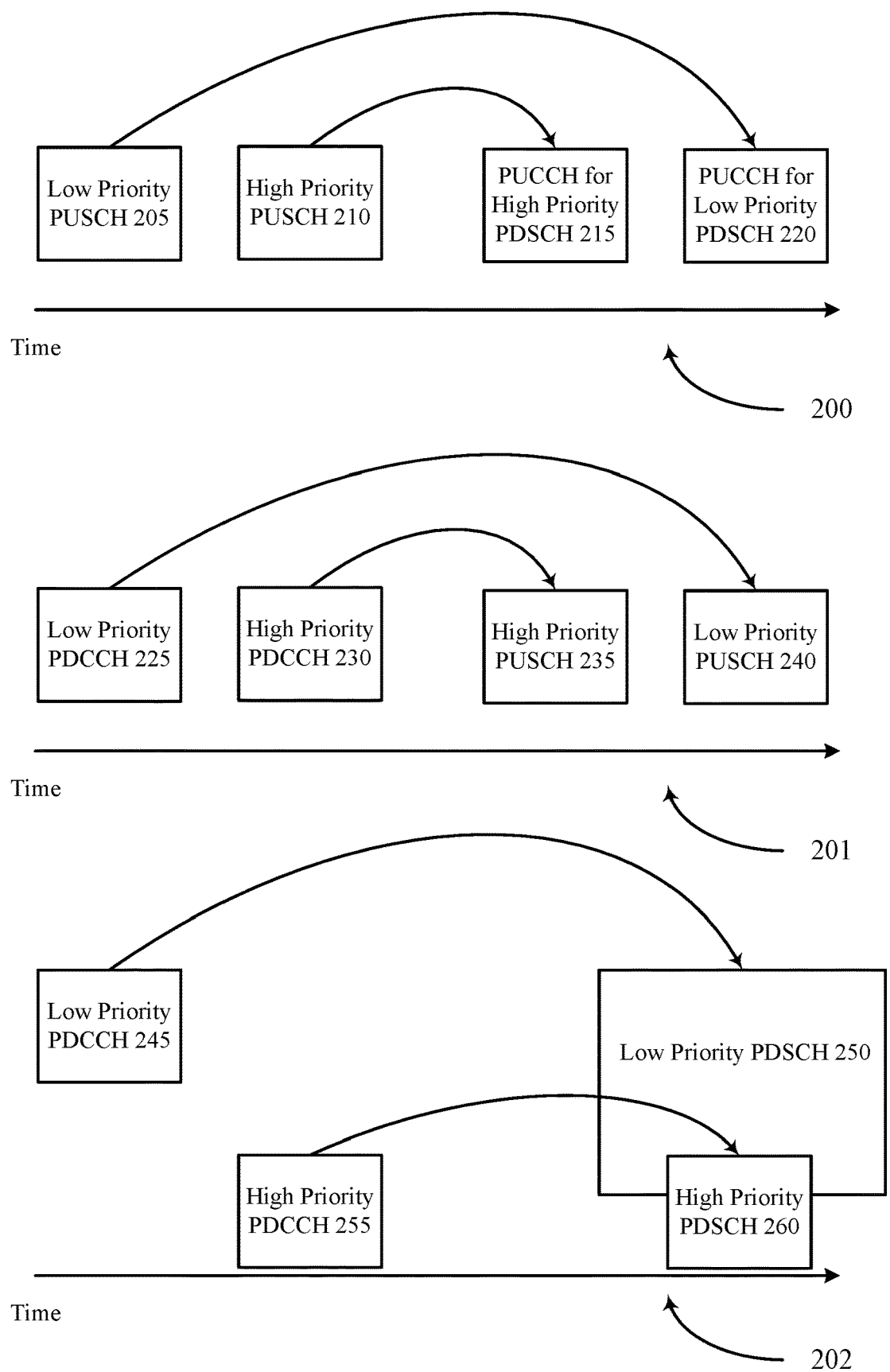
FIG. 2 illustrates examples of timelines that support mixed capability signaling for supporting out of order operations in accordance with aspects of the present disclosure.

FIG. 2 illustrates an example of a timeline 200, a timeline 201, and a timeline 202 that support mixed capability signaling for supporting out of order operations in accordance with aspects of the present disclosure. In some examples, timelines 200, 201, and 202 may implement aspects of wireless communications system 100.

In some examples of a wireless communications systems (e.g., an NR system), some signals may be received or transmitted out of order (e.g., based on a priority level). For instance, some wireless communications systems may support out of order HARQ signaling, out of order physical uplink shared channel (PUSCH) scheduling, intra-UE downlink collisions, and the like.

In some examples, as described with respect to timeline 200, a wireless communications system may support out of order HARQ. In such examples, a high priority physical downlink shared channel (PDSCH) received after a low priority PDSCH may begin before the physical uplink control channel (PUCCH) for the low priority PDSCH. That is, a UE 115 may receive a low priority PUSCH 205, and may subsequently receive a high priority PUSCH 210. Before transmitting a HARQ message over a PUCCH for the low priority PDSCH 220, the UE 115 may transmit a HARQ message over a PUCCH for the high priority PDSCH 215.

In some examples, as described with respect to timeline 201, a wireless communications system may support out of order PUSCH scheduling. In such examples, a high priority uplink downlink control information (DCI) grant received after a low priority uplink grant may schedule a high priority PUSCH, which may begin before the low priority PUSCH. That is, a UE 115 may receive a low priority physical downlink control channel (PDCCH) 225, including an uplink grant indicating PUSCH resources for low priority PUSCH 240. Subsequently, the UE 115 may receive a high priority PDCCH 230, including an uplink grant indicating PUSCH resources for high priority PUSCH 235, which begins before low priority PUSCH 240. In such examples, UE 115 may transmit the high priority uplink transmission via high priority PUSCH 235 before transmitting the low priority uplink transmission via low priority PUSCH 240.

In some examples, as described with respect to timeline 202, a wireless communications system may support out of order PDSCH scheduling, where a high priority PDCCH schedules a high priority PDSCH that overlaps with a low priority PDSCH. For instance, a UE 115 may receive a low priority PDCCH 245 (e.g., over a first frequency range), including a downlink grant indicating resources over which to receive low priority PDSCH 250. Subsequently, the UE 115 may receive a high priority PDCCH (e.g., over a second frequency range that may be different, partially overlapping, or the same as the first frequency range), including a downlink grant indicating resources over which to receive high priority PDSCH 260. In some examples, high priority PDSCH 260 may partially or completely overlap with low priority PDSCH 250, which may result in a downlink collision. In such examples, UE 115 may drop part, or all of, the low priority PDSCH 250. In some cases, the priority levels (e.g., the high priority or low priority levels) may be associated with the channels, a minimum processing time, or both.

Figure 5:
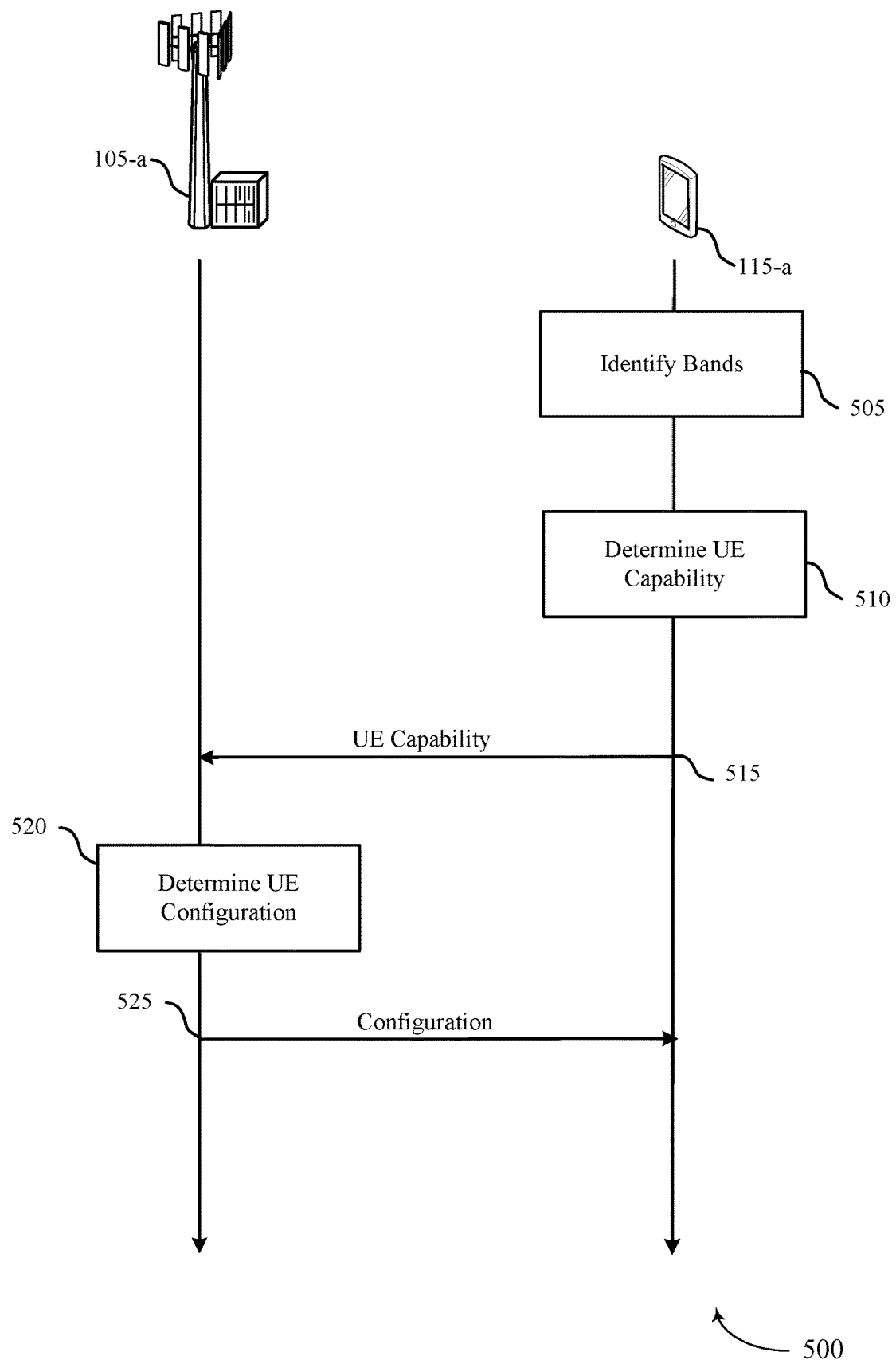
FIG. 5 illustrates an example of a process flow that supports mixed capability signaling for supporting out of order operations in accordance with aspects of the present disclosure.

In some examples, a UE 115 may be capable of receiving and processing one or more channels on one or more component carriers, as described in greater detail with respect to FIG. 5. In such examples, the UE 115 may be capable of addressing out of order signaling on a single component carrier, or multiple component carriers, or may be incapable of addressing out of order signaling. The UE 115 may signal such capabilities, and a base station 105 may configure the UE 115 according to the indicated capabilities. These techniques may be employed for at least some if not all of the examples shown in FIG. 2, including those described herein and shown with reference to timelines 200, 201, and 202, which may be different than other techniques.

Figure 3:
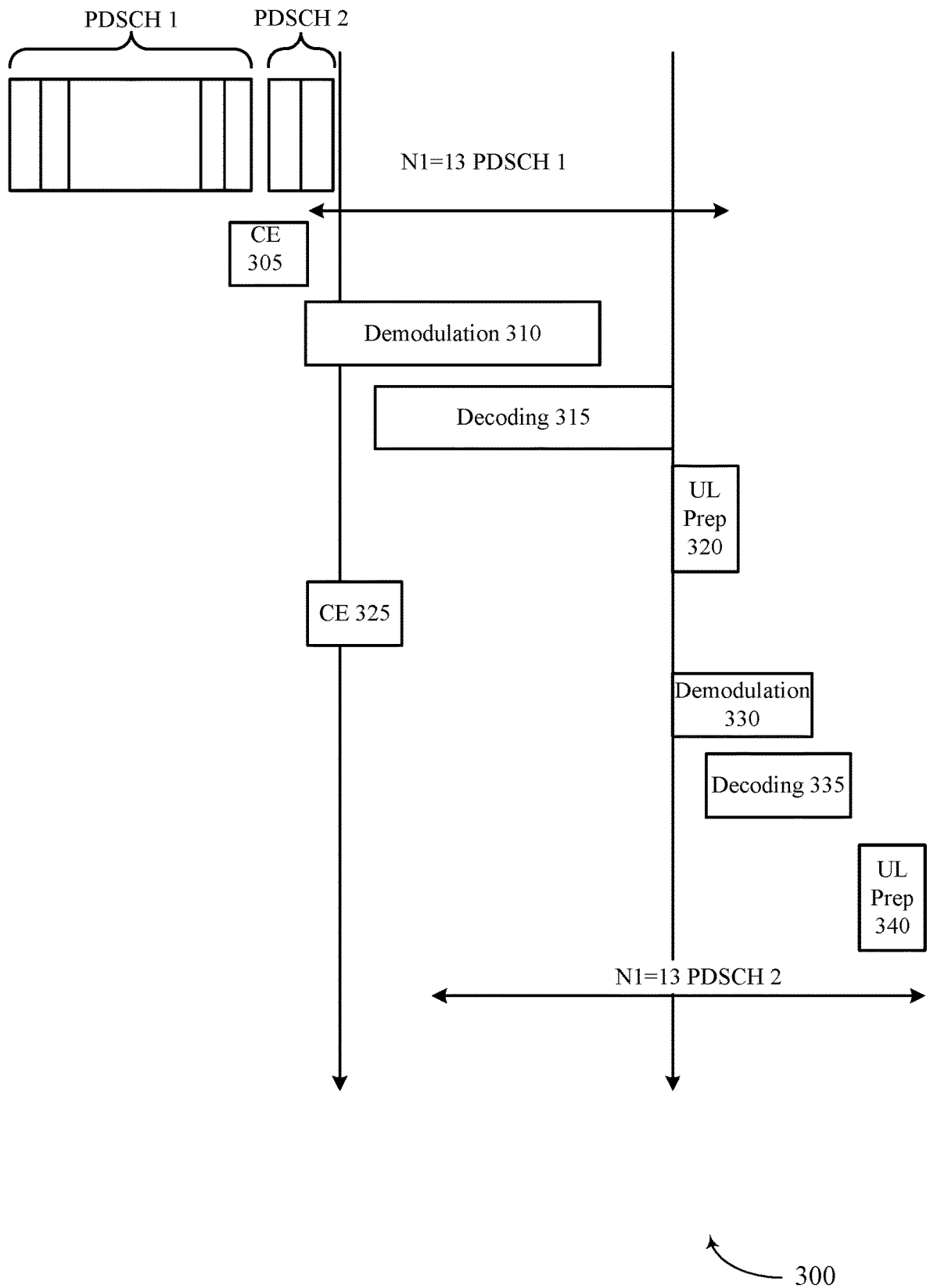
FIG. 3 illustrates an example of a process flow that supports mixed capability signaling for supporting out of order operations in accordance with aspects of the present disclosure.

FIG. 3 illustrates an example of a process flow 300 that supports mixed capability signaling for supporting out of order operations in accordance with aspects of the present disclosure. In some examples, process flow 300 may implement aspects of wireless communications system 100.

In some examples, out of order signaling (e.g., out of order HARQ signaling, out of order PUSCH scheduling, intra-UE downlink collisions, and the like) may impact a UE processing pipelining (e.g., making perfect pipelining impossible).

In some examples of pipelining procedures, a UE 115 may receive a PDSCH 1 and a PDSCH 2. In some cases, PDSCH 1 may include 14 symbols, and PDSCH 2 may include 2 symbols. The UE 115 may perform channel estimation 305 prior to the end of PDSCH 1. Upon completing channel estimation 305, the UE 115 may perform demodulation 310 on the data of PDSCH 1. The UE 115 may initiate decoding 315 on the demodulated data from PDSCH 1. Upon completely decoding 315, the UE 115 may perform uplink preparation 320, upon which the UE 115 is prepared to transmit an uplink message based on the demodulated and decoded PDSCH 1. The total time for this process may be referred to as N1 (e.g., a minimum process time) which may be, for example, equal to 13 symbols.

In some cases, the UE 115 may be capable of demodulating or decoding one signal at a time. Thus, the UE 115 may pipeline the processing of PDSCH 1 and PDSCH 2. Upon receiving PDSCH 2, the UE 115 may perform channel estimation 325. However, the UE 115 may wait to perform demodulation 330 until the decoding 315 is complete. After the decoding 315 is complete, the UE 115 may perform demodulation 330 and then decoding 335 of PDSCH 2, and may then perform uplink preparation 340. Thus, the total time for the second procedure may be equal to that of the PDSCH 1, even if PDSCH 2 is significantly shorter, because of the perfect pipelining. That is, such procedures may result in possible pipelining, even in out of order cases.

In some examples, however, a UE 115 may be capable of receiving and processing one or more channels on one or more component carriers, as described in greater detail with respect to FIG. 5. Pipelining procedures may therefore be relaxed, or the constraints of such pipelining may be address and mitigated. In some cases, the UE pipelining may be impacted because different channels that may be associated with different minimum processing timing capabilities may be mixed on the same serving cell. This may occur regardless of whether the transmission are in order or out of order. In such examples, the UE 115 may be capable of addressing out of order signaling on a single component carrier, or multiple component carriers, or may be incapable of addressing out of order signaling. The UE 115 may signal such capabilities (e.g., to a base station 105), and the base station 105 may configure the UE 115 according to the indicated capabilities. These techniques may be employed for at least some of the examples shown in FIG. 3, including those described herein and shown with reference to process flow 300, which may be different than other techniques.

Figure 4:
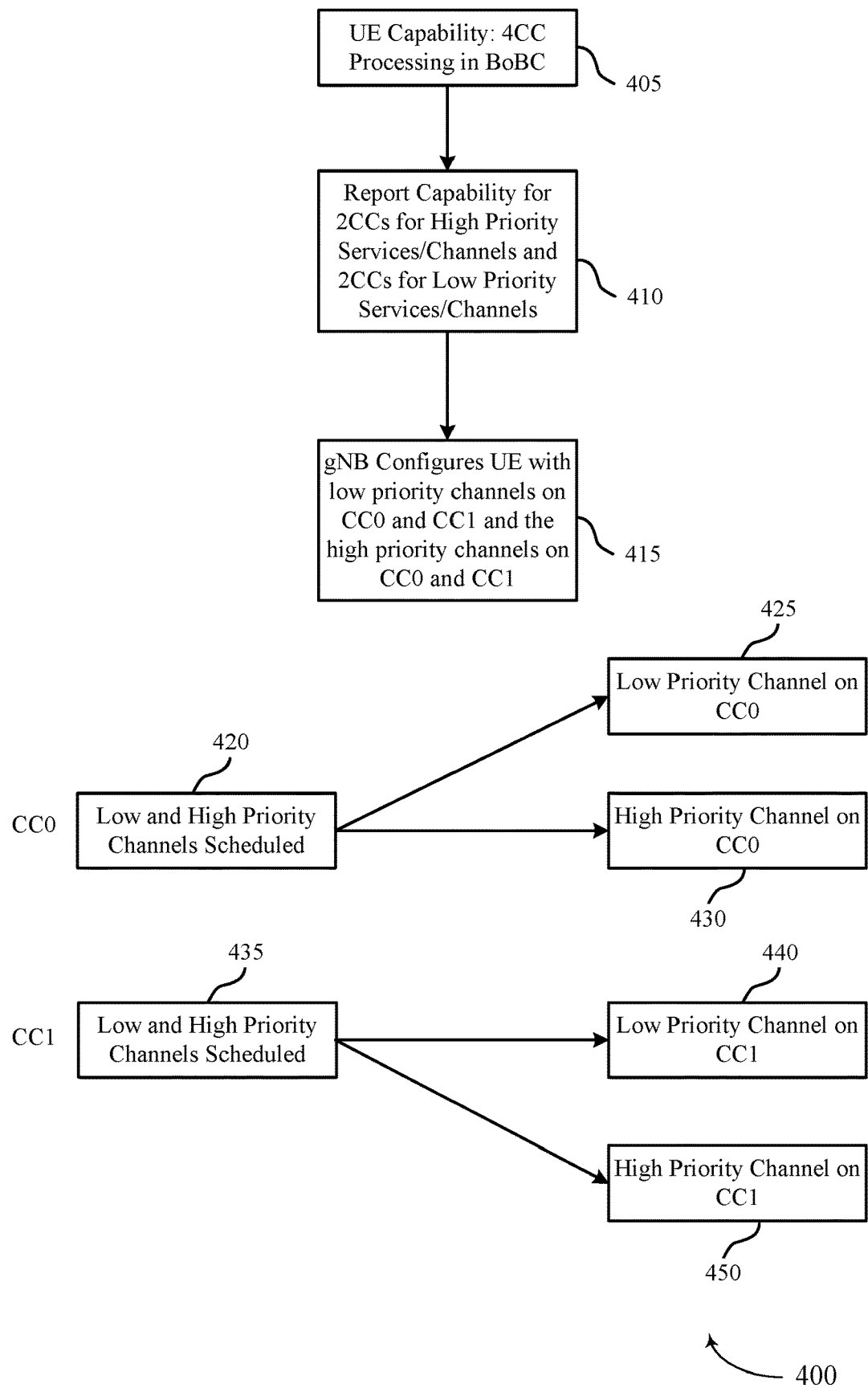
FIG. 4 illustrates an example of a channel configuration that supports mixed capability signaling for supporting out of order operations in accordance with aspects of the present disclosure.

FIG. 4 illustrates an example of a channel configuration 400 that supports mixed capability signaling for supporting out of order operations in accordance with aspects of the present disclosure. In some examples, channel configuration 400 may implement aspects of wireless communications system 100.

In some examples, out of order signaling (e.g., where a UE 115 is capable of processing multiple channels simultaneously) may be addressed in a variety of ways. For instance, in a first example, a UE 115 may be configured or pre-configured to process a second PDSCH in any or all out of order cases. In such examples, the UE 115 may refrain from dropping processing of the first channel received.

In some other examples, a UE 115 may process both first and second PDSCHs as a UE capability with no conditions. In some cases, the UE 115 may process both first and second channels under some conditions (e.g., using the CA capability), as described in detail herein. In such examples, these conditions may be reported as one or more UE capabilities. If the conditions are not satisfied, the UE behavior may not be defined. In some examples, the UE 115 may drop the first PDSCH based on a rule, or the scheduling conditions may be defined. If not satisfied, the UE 115 may drop the processing of the first channel. These examples may also be applied to overlapping downlink and in the case of HARQ reporting, or other out of order signaling. In some cases, if PUSCHs overlap in the time domain, the low priority channel may be dropped.

In some examples, a UE 115 may support out-of-order HARQ and uplink scheduling, out-of-order PDSCH scheduling, or PDSCHs of different priorities that overlap in time, for example, on the same serving cell. The UE 115 may indicate the number of component carriers that may be supported for low priority services and a number of component carriers that may be supported for high priority services in each band of a band combination. Channels associated with different priorities may be scheduled in an out of order fashion. In some examples, channels associated with the same priority may be scheduled in order. The UE 115 may process both low priority and high priority channels on the same component carrier without dropping except when two PUSCHs are overlapping.

In some examples, for handling collisions between low and high priority PDSCHs, a UE 115 may indicate a number of supported component carriers for low priority services and a number of component carriers that the UE 115 may support for high priority services in each band of a band combination. The PDSCHs associated with different priorities may be overlapping. The UE 115 may process both low priority and high priority PDSCHs without dropping them. In some examples, the UE 115 may also report a capability associated with processing all channels without dropping the out of order channels (e.g., if scheduled on the same channel or different channels, etc.) as described in greater detail with respect to FIG. 5.

In some examples, a UE 115 may report (e.g., per band of a band combination, per band combination, or both), a number of cells that may be configured with low priority service and the number of cells that may be configured with the high priority service for the UE 115 to support the out of order operation. For instance, for a given band of a band combination including two component carriers, a UE 115 may report an ability to support one component carrier with a first timing capability and one component carrier with a second timing capability. Thus, if the UE 115 supports CA capabilities, then the base station 105 may configure the UE 115 with a component carrier 0 with a first timing capability and a component carrier 1 with a second capability, or a component carrier 0 with a first and second timing capability, where the PDSCHs can be out-of-order and all of them will be processed. If the UE 115 does not support CA capabilities, then the UE 115 may be configured with first and second timing capabilities on the component carrier 0. In such examples, low and high priority channels may be processed by the UE 115.

In some examples, such as at 405, a UE 115 may determine a capability for processing one or more (e.g., four) component carriers in a given band of a band combination. At 410, the UE 115 may report one or more capabilities to a base station 105 (e.g., the UE 115 may be capable of processing two component carriers for high priority services or high priority channels, and two component carriers for low priority services or low priority channels). In some examples, one or more channels may be flagged or configured to carry high or low priority services. In such examples, upon receiving the UE capabilities report, a base station 105 may configure the UE 115 with low priority channels on a first component carrier 0 and a second component carrier 1, and may configure high priority channels on the first component carrier 0 and the second component carrier 1.

For instance, at 420, the base station 105 may schedule both high and low priority channels. The base station 105 may schedule the UE 115 with low priority channel 425 on component carrier 0, and high priority channel 430 on component carrier 0. The base station 105 may also schedule (e.g., at 435) low and high priority channels on component carrier 1. The base station 105 may schedule low priority channel 440 on component carrier 1, and may schedule high priority channel 450 on the same component carrier 1, based on the UE reporting. In some examples, the UE 115 may be capable of addressing out of order signaling on a single component carrier, or multiple component carriers, or may be incapable of addressing out of order signaling in some cases. The UE 115 may signal such capabilities (including whether the UE 115 will process multiple channels on the same component carrier without dropping one of the signals), and a base station 105 may configure the UE 115 according to the indicated capabilities, as described in greater detail with respect to FIG. 5.

FIG. 5 illustrates an example of a process flow 500 that supports mixed capability signaling for supporting out of order operations in accordance with aspects of the present disclosure. In some examples, process flow 500 may implement aspects of wireless communications system 100. UE 115-*a* and base station 105-*a* may be an example of corresponding devices shown in wireless communications system 100.

In some examples, UE 115-*a* may not support CA capabilities in some bands of a band combination, and may support CA capabilities on other bands of the band combination. Additionally or alternatively, UE 115-*a* may indicate (e.g., in a UE capability report) that UE 115-*a* does not support processing all configured channels without dropping channels having different priorities or associated with different processing timeline capabilities (whether in order or out of order). In some examples, UE 115-*a* may not have orthogonal processing resources available (e.g., for simultaneously processing multiple channels). In such examples, a combination procedure for addressing out of order channels or different priority channels may be utilized. UE 115-*a* may signal one or more capabilities to base station 105-*a*.

At 505, UE 115-*a* may identify one or more bands (e.g., associated with a band combination). At 510, UE 115-*a* may (e.g., for each of the one or more bands identified at 505), determine one or more UE capabilities for a UE capability report or indication. For each given band of a band combination, UE 115-*a* may identify a number of component carriers for low priority service (e.g., configured for low priority service and not high priority service, such as eMBB and ultra-reliable and low-latency communications (URLLC) services respectively), and a number of component carriers for high priority service (which may or may not be reported). In some examples, channel priorities may be indicated via one or more of DCI format, DCI size, radio network temporary identifier (RNTI) used to scramble the CRC of a scheduling DCI, control resource set (CORESET) or search space set-up where a DCI is received, a bit field included in a DCI, or any combination thereof. In some cases, channel priority indications may be associated with a CORESET index. In some examples, service priority may not be visible at the physical layer, and instead channel priorities may be defined (e.g., a channel configured with a second timing capability may be of higher priority than a channel configured with a first timing priority).

In some cases, UE 115-*a* may determine whether UE 115-*a* is configured with a capability (e.g., associated with the identified one or more bands) to support a first component carrier for a first priority of service, support a second component carrier for a second priority of service, process one or more channels associated with the first priority of service and the second priority of service on a component carrier, or a combination thereof. For the case of supporting different services with different priorities, UE 115-*a* may identify specific capabilities regarding supported priorities and ability to process multiple channels having different priorities on the same component carrier without dropping any channels.

For example, for each band identified at 505, UE 115-*a* may determine (e.g., in addition to a number of component carriers for low priority service and a number of component carriers for high priority service) if UE 115-*a* is capable of processing all configured channels of different priorities or associated with different processing timeline capabilities (e.g., whether in order or out of order) on the same component carrier without dropping a channel. In some examples, the capability to process different priority channels on the same component carrier without dropping may not apply to the case in which two channels, such as two PUSCHs, overlap.

At 515, UE 115-*a* may transmit a UE capability report to base station 105-*a*. The UE capability report may include an indication of, for each band identified at 505, a number of component carriers for low priority service (e.g., eMBB service), a number of component carriers for high priority service (e.g., URLLC service), and if UE 115-*a* is capable of processing all configured channels (e.g., without dropping channels having different priorities or associated with different processing timeline capabilities).

At 520, base station 105-*a* determine one or more configurations for UE 115-*a* based on the information received from UE 115-*a*. This information may include an indication of a number of component carriers for low priority service (e.g., eMBB service), a number of component carriers for high priority service (e.g., URLLC service), and an indication of whether UE 115-*a* is capable of processing configured channels (e.g., without dropping a channel in the case of an out of order downlink or uplink) for at least some if not each band identified at 505.

At 525, base station 105-*a* may send configuration information to UE 115-*a*, based on the UE capability report and determining the configuration. The configuration may apply to at least one component carrier of the UE 115-*a*. In some examples, the configuration information may be based on the UE capability report transmitted at 515.

In some examples, UE 115-*a* may indicate (e.g., at 515) that UE 115-*a* is capable of processing all channels on a component carrier (e.g., without dropping any channels on the component carrier). At 520, base station 105-*a* may schedule low priority channels and high priority channels on the same component carrier, or on different component carriers. In such examples, base station 105-*a* may not configure channels having the same priority (e.g., two high priority channels out of order on the same component carrier), but channels having a different priority may be scheduled in order or out of order across different component carriers.

In some examples, UE 115-*a* may indicate (e.g., at 515) that UE 115-*a* is not capable of processing channels on a component carrier without dropping one or more. In such examples, base station 105-*a* may refrain from scheduling high priority channels and low priority channels on the same component carrier (e.g., regardless of whether they are in order or out of order).

In some examples, UE 115-*a* may indicate (e.g., at 515) that UE 115-*a* is not capable of processing channels on a component carrier without dropping one or more. In such examples, UE 115-*a* may further indicate (e.g., at 515 in a UE capability report) that UE 115-*a* may be scheduled with channels having different priorities on the same component carrier, but that UE 115-*a* may drop channels having lower priorities under some circumstances.

For example, UE 115-*a* may be configured or preconfigured with one or more channel dropping rules. In such examples, UE 115-*a* may report that UE 115-*a* may be scheduled with channels having different priorities on the same component carrier, but that the UE 115-*a* may drop lower priority channels based on the one or more channel dropping rules. For example, UE 115-*a* may apply UE-specific implementation rules, and may drop or may not drop a scheduled lower priority channel based on the UE-specific implementation rules. In some other examples, UE 115-*a* may drop (e.g., automatically drop) a low-priority channel scheduled on the same component carrier as a high-priority channel (e.g., in an out of order scenario). In some cases, UE 115-*a* may determine whether one or more conditions are satisfied, and may drop low priority channels. For instance, if a low priority channel ends within N1 symbols (e.g., a minimum processing time for the low priority channel) from the beginning of a high priority channel, then UE 115-*a* may drop the low priority channel. Otherwise, UE 115-*a* may process both the high priority channel and the low priority channel.

In other examples, a single field or a combination of fields may indicate a number of component carriers for low priority service, a number of component carriers for high priority service, if UE 115-*a* may process all configured channels on the same component carrier (e.g., without dropping a channel), and whether UE 115-*a* can be configured with high and low priority channels (without being able to process both high and low priority channels) while determining whether or when to drop low priority channels.

For example, a first portion of the UE capability report may indicate a number of component carriers for low priority service (X), a number of component carriers for high priority service (Y). A second portion of the UE capability report may indicate whether UE 115-*a* is capable of processing configured channels of different priorities or associated with different processing timeline capabilities (whether in order or out of order) on a single component carrier without dropping a channel. In some examples (e.g., if UE 115-*a* is not capable of processing all configured channels on a single component carrier without dropping a channel), the UE capability report may include an additional portion (e.g., a flag) indicating either that UE 115-*a* may be capable of being scheduled with high and low priority channels on the same component carrier, but may drop the low priority channels (e.g., a second type of UE), or that base station 105-*a* should not schedule UE 115-*a* with high and low priority channels on the same component carrier (e.g., a second type of UE 115).

In some examples, the number of component carriers for low priority service and the number of component carriers for high priority services may be different, depending on the type of UE 115. For instance, if UE 115-*a* is a first type of UE 115 (e.g., UE 115-*a* may process high and low priority channels on the same component carrier or may not process high and low priority channels on the same component carrier and therefore should not be scheduled with high and low priority channels on the same component carrier), then the UE capability report may include a first number of component carriers for low priority service (X), and a first number of component carriers for high priority service (Y).

However, if UE 115-*a* is a second type of UE 115 (e.g., may not process high and low priority channels on the same component carrier, but may be configured with both high and low priority channels on the same component carrier), then the UE capability report may include a second number of component carriers for low priority service (X'), and a second number of component carriers for high priority service (Y'). In some examples, X and Y may be different than X' and Y'. In some examples (e.g., where UE 115-*a* is a UE 115 of the second type), instead of X' and Y', UE 115-*a* may report a value Z, which may represent the sum of X' and Y', allowing base station 105-*a* to schedule high and low priority channels on Z component carriers, and allowing UE 115-a to drop low priority channels under one or more configured rules.

In some examples, the UE capability report transmitted at 515 may include one or more fields. For instance, a first field may correspond to a first type of UE 115, and a second field may correspond to a second type of UE 115. Base station 105-a may determine a UE type for UE 115-a based at least in part on the presence of one of the fields.

For example, the first field may include one or more bits, which may indicate a number of component carriers for low priority service, a number of component carriers for high priority service, and if UE 115-a may process all configured channels on a component carrier without dropping a channel in the case of an out of order downlink or uplink. The presence of this information in the first field may allow base station 105-a to determine how to schedule high and low priority channels. That is, if the report in the first field indicates that UE 115-a may process all channels on the same component carrier without dropping channels (e.g., a first type of UE 115), then base station 105-a may schedule high and low priority channels on the same component carrier or different component carriers. If the report in the first field indicates that UE 115-a may not process all channels without dropping channels, then base station 105-a may refrain from configuring high and low priority channels on the same component carrier, regardless of order, as described herein (e.g., a first type of UE). This dichotomy may be clearly determined based on the report including the first field, indicating a first type of UE.

If the report includes a second field, however, then UE 115-a may be a second type of UE 115. In such examples, the presence of the second field may indicate that UE 115-a is not capable of processing all channels on a component carrier without dropping channels. Instead, the second field may indicate whether UE 115-a is capable of being scheduled with high and low priority channels on the same component carrier, while determining whether to drop low priority channels. That is, if base station 105-a receives a UE capability report at 515 including the second field, then base station 105-a may determine that UE 115-a may not process high and low priority channels on the same component carrier. But, if indicated in the second field, base station 105-a may schedule high and low priority channels on the same component carrier, and the UE 115 may apply one or more rules and determine whether or when to drop low priority channels.

In some examples, uninhibited scheduling of high and low priority channels at base station 105-a and UE 115-a determining when to drop some channels, may be more cost effective. In some examples, the UE capability report (e.g., the second field) may include an indicator (e.g., a bit) that indicates whether such scheduling is supported at UE 115-a or not. If such scheduling is not supported (e.g., the indicator is turned off), base station 105-a may refrain from scheduling high and low priority channels on the same component carrier. If such scheduling is supported (e.g., the indicator is turned on), then base station 105-a may schedule high and low priority channels on the same component carrier, and UE 115-a may apply one or more rules to determine when to drop low priority channels.

Figure 6:
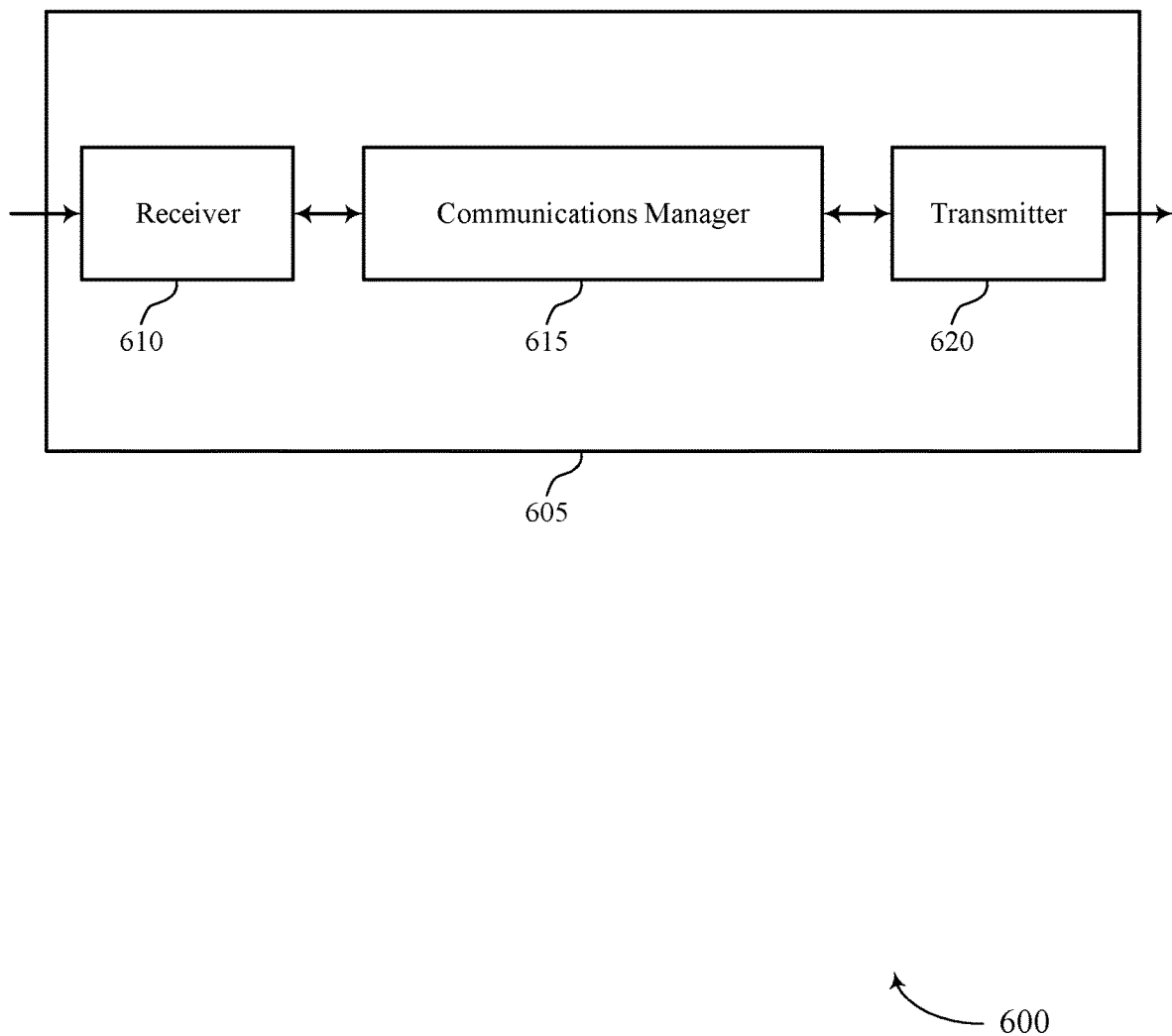
FIGS. 6 and 7 show block diagrams of devices that support mixed capability signaling for supporting out of order operations in accordance with aspects of the present disclosure.

FIG. 6 shows a block diagram 600 of a device 605 that supports mixed capability signaling for supporting out of order operations in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to mixed capability signaling for supporting out of order operations, etc.). Information may be passed on to other components of the device 605. The receiver 610 may be an example of aspects of the transceiver 920 described with reference to FIG. 9. The receiver 610 may utilize a single antenna or a set of antennas.

In some examples, the communications manager 615 may identify one or more bands (e.g., associated with a band combination). In some examples, the communications manager 615 may determine whether the UE is configured with a capability associated with the one or more bands to support a first component carrier for a first priority of service, support a second component carrier for a second priority of service, and process one or more channels associated with the first priority of service and the second priority of service on a component carrier. The communications manager 615 may transmit, to a base station based on the determining, the capability to support one or more component carriers for at least one of the first priority of service or the second priority of service and process the one or more channels associated with the first priority of service and the second priority of service on the component carrier. The communications manager 615 may receive, from the base station based on the transmitting, a configuration for at least one of the one or more component carriers. The communications manager 615 may be an example of aspects of the communications manager 910 described herein.

The actions performed by the communications manager 615 as described herein may be implemented to realize one or more potential advantages. One implementation may enable a UE to transmit capability information regarding processing out of order signaling to a base station. Such indications may enable techniques for efficiently scheduling channels of varying priorities on one or more component carriers, which may result in improved resource scheduling and more efficient communications (e.g., decreased latency in the system), among other advantages.

Based on implementing the indications as described herein, a processor of a UE or base station (e.g., a processor controlling the receiver 610, the communications manager 615, the transmitter 620, or a combination thereof) may communicate over channels of varying priorities while ensuring relatively efficient communications. For example, the capability reporting techniques described herein may leverage whether a UE is capable of processing one or more component carriers with a high priority service, a low priority service, or both, which may realize reduced signaling overhead and power savings, among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
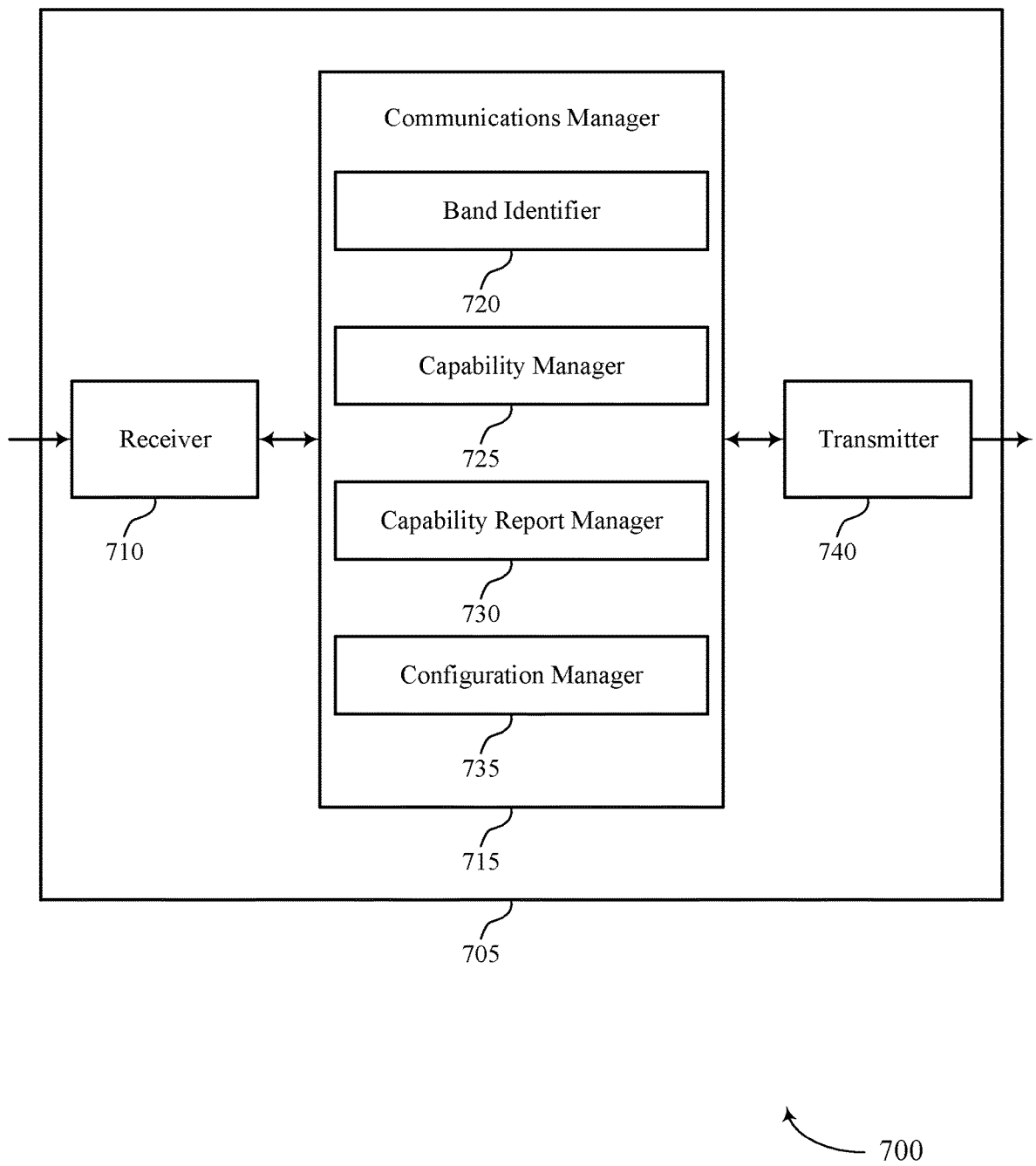

FIG. 7 shows a block diagram 700 of a device 705 that supports mixed capability signaling for supporting out of order operations in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to mixed capability signaling for supporting out of order operations, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a band identifier 720, a capability manager 725, a capability report manager 730, and a configuration manager 735. The communications manager 715 may be an example of aspects of the communications manager 910 described herein.

The band identifier 720 may identify one or more bands (e.g., associated with a band combination). The capability manager 725 may determine whether the UE is configured with a capability associated with the one or more bands to support a first component carrier for a first priority of service, support a second component carrier for a second priority of service, and process one or more channels associated with the first priority of service and the second priority of service on a component carrier.

The capability report manager 730 may transmit, to a base station based on the determining, the capability to support one or more component carriers for at least one of the first priority of service or the second priority of service and process the one or more channels associated with the first priority of service and the second priority of service on the component carrier.

The configuration manager 735 may receive, from the base station based on the transmitting, a configuration for at least one of the one or more component carriers.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
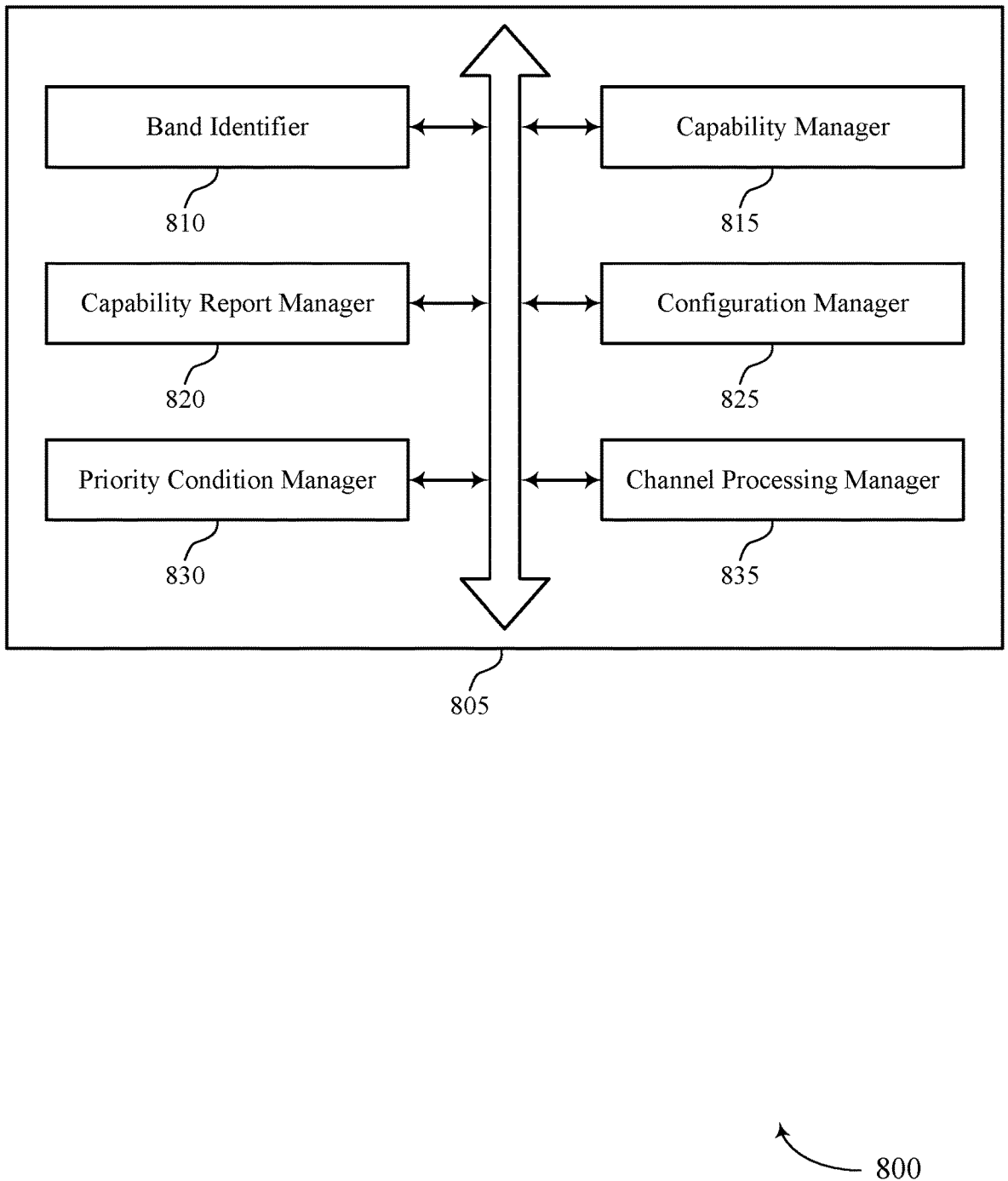
FIG. 8 shows a block diagram of a communications manager that supports mixed capability signaling for supporting out of order operations in accordance with aspects of the present disclosure.

FIG. 8 shows a block diagram 800 of a communications manager 805 that supports mixed capability signaling for supporting out of order operations in accordance with aspects of the present disclosure. The communications manager 805 may be an example of aspects of a communications manager 615, a communications manager 715, or a communications manager 910 described herein. The communications manager 805 may include a band identifier 810, a capability manager 815, a capability report manager 820, a configuration manager 825, a priority condition manager 830, and a channel processing manager 835, Each of these modules may communicate, directly or indirectly, with one another (e.g., via one or more buses).

The band identifier 810 may identify one or more bands (e.g., associated with a band combination). The capability manager 815 may determine whether the UE is configured with a capability associated with the one or more bands to support a first component carrier for a first priority of service, support a second component carrier for a second priority of service, and process one or more channels associated with the first priority of service and the second priority of service on a component carrier. In some cases, the capability manager 815 may receive the one or more channels with the first priority of service and the one or more channels with the second priority of service and process the one or more channels with the second priority of service prior to the one or more channels with the first priority of service, where the second priority of service has a higher priority than the first priority of service.

The capability report manager 820 may transmit, to a base station based on the determining, the capability to support one or more component carriers for at least one of the first priority of service or the second priority of service and process the one or more channels associated with the first priority of service and the second priority of service on the component carrier. In some examples, the capability report manager 820 may transmit an indication that the UE is capable of processing the one or more channels associated with the first priority of service and the second priority of service on the component carrier.

In some examples, the capability report manager 820 may transmit an indication that the UE is incapable of processing the one or more channels associated with the first priority of service and the second priority of service on the component carrier. In some examples, the capability report manager 820 may transmit an indication that the UE is capable of receiving the configuration indicating that one or more channels associated with the first priority of service and the second priority of service are configured on the component carrier, and that the UE is capable of dropping the one or more channels associated with the first priority of service and processing the one or more channels associated with the second priority of service.

The configuration manager 825 may receive, from the base station based on the transmitting, a configuration for at least one of the one or more component carriers. In some examples, the configuration manager 825 may receive the configuration indicating that one or more channels associated with the first priority of service and the second priority of service are configured on the component carrier. In some examples, the configuration manager 825 may receive the configuration indicating that one or more channels associated with the first priority of service and the second priority of service are configured on different component carriers of the one or more component carriers. In some examples, the configuration manager 825 may receive the configuration indicating that one or more channels associated with the first priority of service are configured on the first component carrier and one or more channels associated with the second priority of service are configured on the second component carrier.

The priority condition manager 830 may identify, based on the configuration, one or more priority conditions. In some examples, the priority condition manager 830 may determine whether a difference between an end of the one or more channels associated with the first priority of service and a beginning of the one or more channels associated with the second priority of services satisfies a threshold of transmission time intervals. In some cases, the threshold of transmission time intervals is based on a minimum processing time for the one or more channels associated with the first priority of service.

The channel processing manager 835 may determine, based on the identifying, whether to process the one or more channels associated with the first priority of service. In some examples, the channel processing manager 835 may process, based on the identifying, at least the one or more channels associated with the second priority of service. In some examples, the channel processing manager 835 may process, based on the configuration, the one or more channels associated with the second priority of service. In some examples, the channel processing manager 835 may drop, based on the indication, the one or more channels associated with the first priority of service.

In some examples, the channel processing manager 835 may process, based on determining whether the difference satisfies the threshold of transmission time intervals, the one or more channels associated with the second priority of service. In some examples, the channel processing manager 835 may determine, based on determining whether the difference satisfies the threshold of transmission time intervals, to drop the one or more channels associated with the first priority of service. In some examples, the channel processing manager 835 may determine, based on determining whether the difference satisfies the threshold of transmission time intervals, whether to process the one or more channels associated with the first priority of service. In some examples, the channel processing manager 835 may process, based on determining whether the difference satisfies the threshold of transmission time intervals, the one or more channels associated with the second priority of service.

Figure 9:
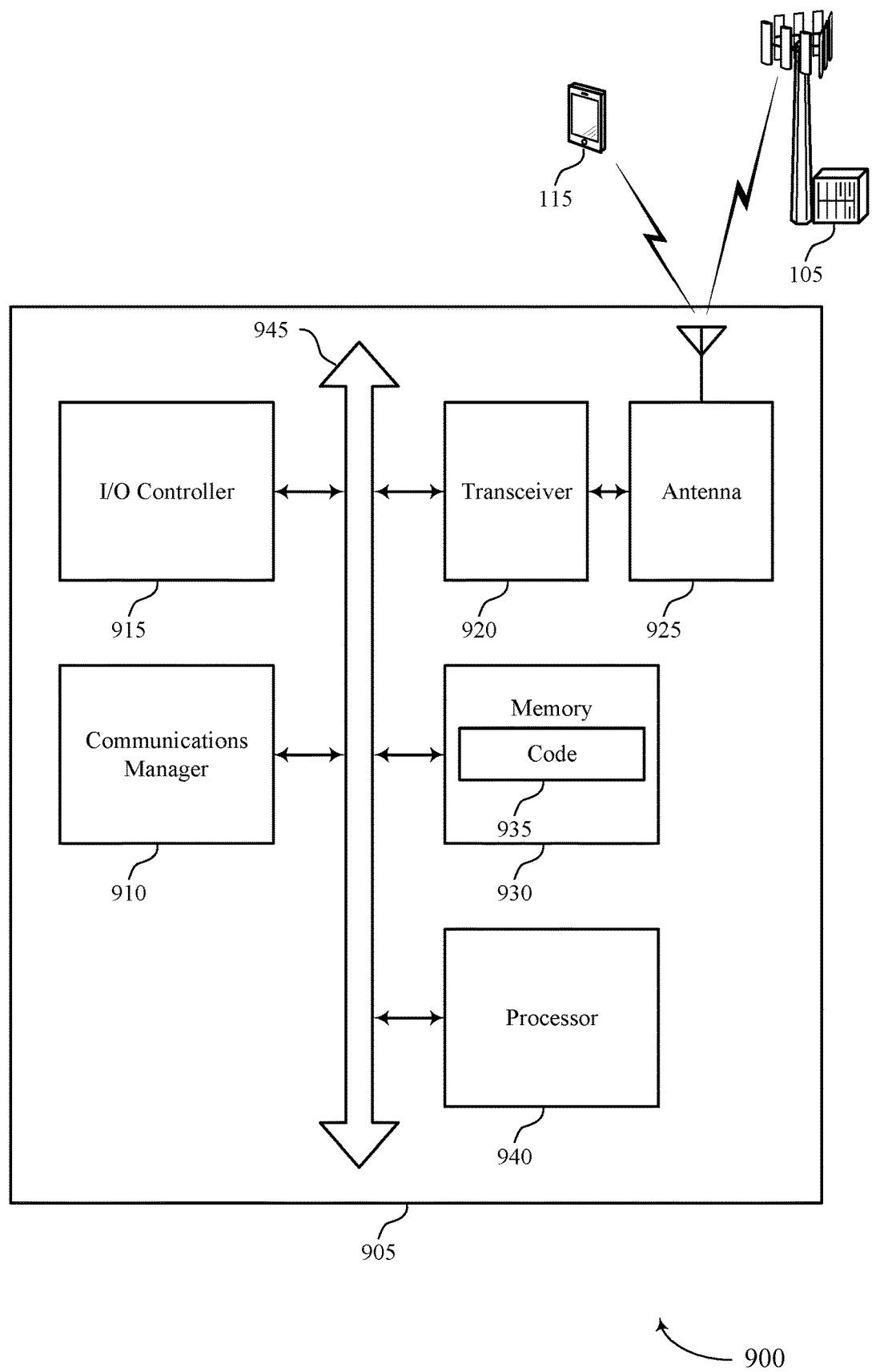
FIG. 9 shows a diagram of a system including a device that supports mixed capability signaling for supporting out of order operations in accordance with aspects of the present disclosure.

FIG. 9 shows a diagram of a system 900 including a device 905 that supports mixed capability signaling for supporting out of order operations in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify one or more bands (e.g., associated with a band combination). The communications manager 910 may determine whether the UE is configured with a capability associated with the one or more bands to support a first component carrier for a first priority of service, support a second component carrier for a second priority of service, and process one or more channels associated with the first priority of service and the second priority of service on a component carrier. The communications manager 910 may transmit, to a base station based on the determining, the capability to support one or more component carriers for at least one of the first priority of service or the second priority of service and process the one or more channels associated with the first priority of service and the second priority of service on the component carrier. The communications manager 910 may receive, from the base station based on the transmitting, a configuration for at least one of the one or more component carriers.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting mixed capability signaling for supporting out of order operations).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
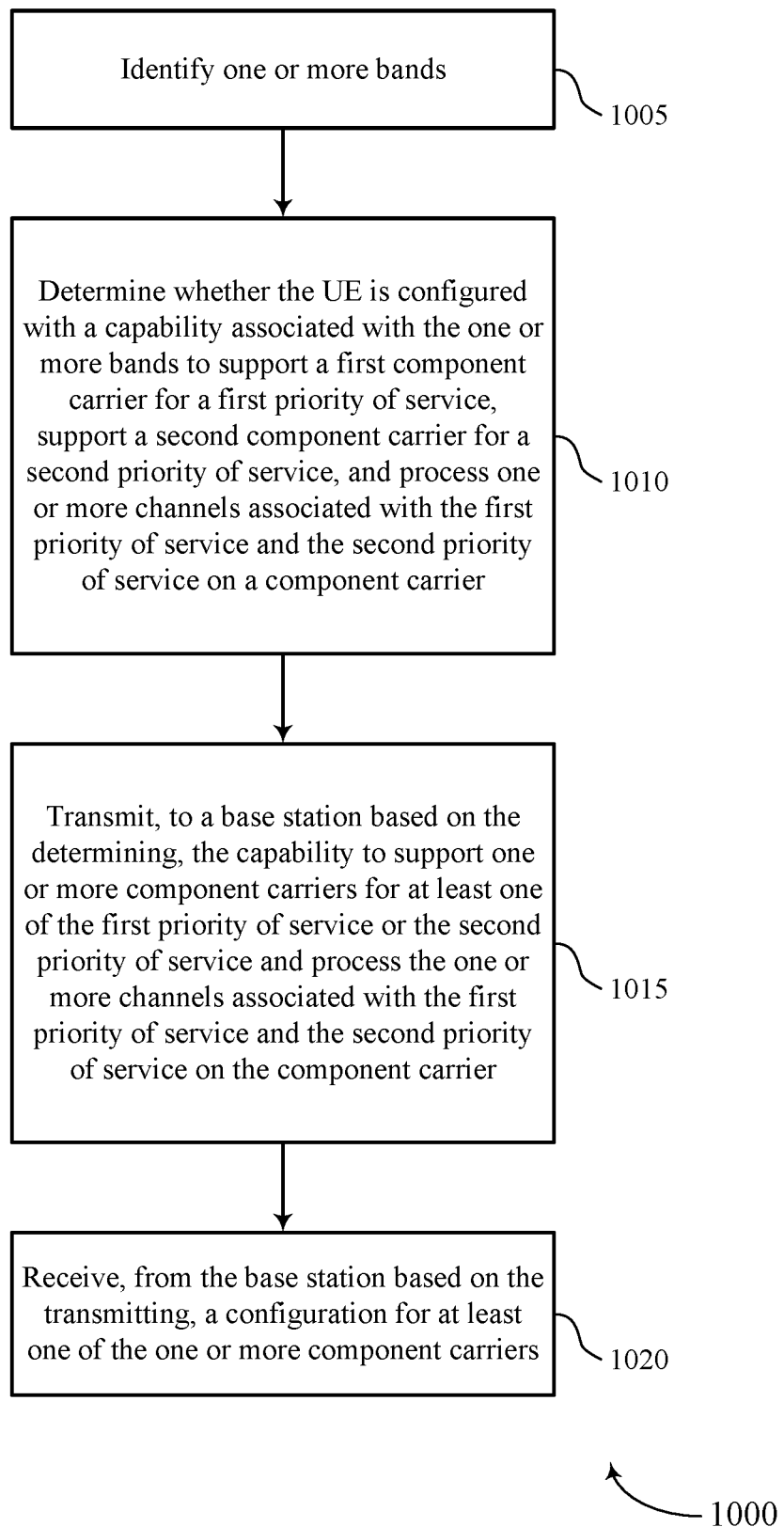
FIG. 10 shows a flowchart illustrating methods that support mixed capability signaling for supporting out of order operations in accordance with aspects of the present disclosure.

FIG. 10 shows a flowchart illustrating a method 1000 that supports mixed capability signaling for supporting out of order operations in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1005, the UE may identify one or more bands (e.g., associated with a band combination). The operations of 1005 may be performed according to the methods described herein. In some examples, aspects of the operations of 1005 may be performed by a band identifier as described with reference to FIGS. 6 through 9.

At 1010, the UE may determine whether the UE is configured with a capability associated with the one or more bands to support a first component carrier for a first priority of service, support a second component carrier for a second priority of service, and process one or more channels associated with the first priority of service and the second priority of service on a component carrier. The operations of 1010 may be performed according to the methods described herein. In some examples, aspects of the operations of 1010 may be performed by a capability manager as described with reference to FIGS. 6 through 9.

At 1015, the UE may transmit, to a base station based on the determining, the capability to support one or more component carriers for at least one of the first priority of service or the second priority of service and process the one or more channels associated with the first priority of service and the second priority of service on the component carrier. The operations of 1015 may be performed according to the methods described herein. In some examples, aspects of the operations of 1015 may be performed by a capability report manager as described with reference to FIGS. 6 through 9.

At 1020, the UE may receive, from the base station based on the transmitting, a configuration for at least one of the one or more component carriers. The operations of 1020 may be performed according to the methods described herein. In some examples, aspects of the operations of 1020 may be performed by a configuration manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying one or more frequency bands, a frequency band of the one or more frequency bands comprising a plurality of component carriers associated with a serving cell, the plurality of component carriers comprising a first quantity of component carriers for a first priority of service and a second quantity of component carriers for a second priority of service, wherein the first priority of service is different from the second priority of service;
    determining whether the UE is configured with a first capability to support the first quantity of component carriers in the frequency band, a second capability to support the second quantity of component carriers in the frequency band, and a third capability to process one or more channels associated with the first priority of service and the second priority of service on a component carrier of the plurality of component carriers;
    transmitting, to a base station based at least in part on the determining, a capability report comprising the first capability to support the first quantity of component carriers for the first priority of service, the second capability to support the second quantity of component carriers for the second priority of service, and the third capability to process the one or more channels associated with the first priority of service and the second priority of service on the component carrier; and receiving, from the base station based at least in part on transmitting the capability report, a configuration for processing the one or more channels associated with the first priority of service and the second priority of service on the component carrier of the plurality of component carriers.

2. The method of claim 1, wherein transmitting the capability report further comprises:

transmitting an indication that the UE is capable of processing the one or more channels associated with the first priority of service and the second priority of service on the component carrier.

3. The method of claim 2, wherein receiving the configuration further comprises:

receiving the configuration indicating that the one or more channels associated with the first priority of service and the second priority of service are configured on the component carrier.

4. The method of claim 2, wherein receiving the configuration further comprises:

receiving the configuration indicating that the one or more channels associated with the first priority of service and the second priority of service are configured on different component carriers of the first quantity of component carriers and the second quantity of component carriers.

5. The method of claim 1, wherein transmitting the capability report further comprises:

transmitting an indication that the UE is incapable of processing the one or more channels associated with the first priority of service and the second priority of service on the component carrier, wherein the third capability comprises the indication.

6. The method of claim 5, wherein receiving the configuration further comprises:

receiving the configuration indicating that one or more first channels associated with the first priority of service are configured on a first component carrier and one or more second channels associated with the second priority of service are configured on a second component carrier.

7. The method of claim 5, wherein transmitting the indication further comprises:

transmitting an indication that the UE is capable of receiving the configuration indicating that the one or more channels associated with the first priority of service and the second priority of service are configured on the component carrier, and that the UE is capable of dropping one or more first channels associated with the first priority of service and processing one or more second channels associated with the second priority of service.

8. The method of claim 1, wherein receiving the configuration further comprises:

receiving the configuration indicating that the one or more channels associated with the first priority of service and the second priority of service are configured on the component carrier.

9. The method of claim 8, further comprising:

identifying, based at least in part on the configuration, one or more priority conditions;

determining, based at least in part on the identifying, whether to process one or more first channels associated with the first priority of service; and processing, based at least in part on the identifying, at least one or more second channels associated with the second priority of service.

10. The method of claim 8, further comprising:

processing, based at least in part on the configuration, one or more second channels associated with the second priority of service; and dropping, based at least in part on the indication, one or more first channels associated with the first priority of service.

11. The method of claim 8, further comprising:

determining whether a difference between an end of one or more first channels associated with the first priority of service and a beginning of one or more second channels associated with the second priority of service satisfies a threshold of transmission time intervals;

processing, based at least in part on determining whether the difference satisfies the threshold of transmission time intervals, the one or more second channels associated with the second priority of service; and determining, based at least in part on determining whether the difference satisfies the threshold of transmission time intervals, to drop the one or more first channels associated with the first priority of service.

12. The method of claim 8, further comprising:

determining whether a difference between an end of one or more first channels associated with the first priority of service and a beginning of one or more second channels associated with the second priority of service satisfies a threshold of transmission time intervals;

processing, based at least in part on determining whether the difference satisfies the threshold of transmission time intervals, the one or more second channels associated with the second priority of service; and determining, based at least in part on determining whether the difference satisfies the threshold of transmission time intervals, whether to process the one or more first channels associated with the first priority of service.

13. The method of claim 12, wherein the threshold of transmission time intervals is based at least in part on a minimum processing time for the one or more first channels associated with the first priority of service.

14. The method of claim 1, further comprising:

receiving one or more first channels associated with the first priority of service;

receiving one or more second channels associated with the second priority of service; and processing the one or more second channels associated with the second priority of service prior to the one or more first channels associated with the first priority of service, wherein the second priority of service has a higher priority than the first priority of service.

15. An apparatus for wireless communication at a user equipment (UE), comprising:

a processor, memory in electronic communication with the processor; and instructions stored in the memory and executable by the processor to cause the apparatus to:

identify one or more frequency bands, a frequency band of the one or more frequency bands comprising a plurality of component carriers associated with a serving cell, the plurality of component carriers comprising a first quantity of component carriers for a first priority of service and a second quantity of component carriers for a second priority of service, wherein the first priority of service is different from the second priority of service;

determine whether the UE is configured with a first capability to support the first quantity of component carriers in the frequency band, a second capability to support the second quantity of component carriers in the frequency band, and a third capability to process one or more channels associated with the first priority of service and the second priority of service on a component carrier of the plurality of component carriers;

transmit, to a base station based at least in part on the determining, a capability report comprising the first capability to support the first quantity of component carriers for the first priority of service, the second capability to support the second quantity of component carriers the second priority of service, and the third capability to process the one or more channels associated with the first priority of service and the second priority of service on the component carrier; and receive, from the base station based at least in part on transmitting the capability report, a configuration for processing the one or more channels associated with the first priority of service and the second priority of service on the component carrier of the plurality of component carriers.

16. The apparatus of claim 15, wherein the instructions to transmit the capability report further are executable by the processor to cause the apparatus to:

transmit an indication that the UE is capable of processing the one or more channels associated with the first priority of service and the second priority of service on the component carrier.

17. The apparatus of claim 16, wherein the instructions to receive the configuration further are executable by the processor to cause the apparatus to:

receive the configuration indicating that the one or more channels associated with the first priority of service and the second priority of service are configured on the component carrier.

18. The apparatus of claim 16, wherein the instructions to receive the configuration further are executable by the processor to cause the apparatus to:

receive the configuration indicating that the one or more channels associated with the first priority of service and the second priority of service are configured on different component carriers of the first quantity of component carriers and the second quantity of component carriers.

19. The apparatus of claim 15, wherein the instructions to transmit the capability report further are executable by the processor to cause the apparatus to:

transmit an indication that the UE is incapable of processing the one or more channels associated with the first priority of service and the second priority of service on the component carrier, wherein the third capability comprises the indication.

20. The apparatus of claim 19, wherein the instructions to receive the configuration further are executable by the processor to cause the apparatus to:

receive the configuration indicating that one or more first channels associated with the first priority of service are configured on a first component carrier and one or more second channels associated with the second priority of service are configured on a second component carrier.

21. The apparatus of claim 19, wherein the instructions to transmit the indication further are executable by the processor to cause the apparatus to:

transmit an indication that the UE is capable of receiving the configuration indicating that the one or more channels associated with the first priority of service and the second priority of service are configured on the component carrier, and that the UE is capable of dropping one or more first channels associated with the first priority of service and processing one or more second channels associated with the second priority of service.

22. The apparatus of claim 15, wherein the instructions to receive the configuration further are executable by the processor to cause the apparatus to:

receive the configuration indicating that one or more channels associated with the first priority of service and the second priority of service are configured on the component carrier.

23. The apparatus of claim 22, wherein the instructions are further executable by the processor to cause the apparatus to:

identify, based at least in part on the configuration, one or more priority conditions;

determine, based at least in part on the identifying, whether to process one or more first channels associated with the first priority of service; and process, based at least in part on the identifying, at least one or more second channels associated with the second priority of service.

24. The apparatus of claim 22, wherein the instructions are further executable by the processor to cause the apparatus to:

process, based at least in part on the configuration, one or more second channels associated with the second priority of service; and drop, based at least in part on the indication, one or more first channels associated with the first priority of service.

25. The apparatus of claim 22, wherein the instructions are further executable by the processor to cause the apparatus to:

determine whether a difference between an end of one or more first channels associated with the first priority of service and a beginning of one or more second channels associated with the second priority of service satisfies a threshold of transmission time intervals;

process, based at least in part on determining whether the difference satisfies the threshold of transmission time intervals, the one or more second channels associated with the second priority of service; and determine, based at least in part on determining whether the difference satisfies the threshold of transmission time intervals, to drop the one or more first channels associated with the first priority of service.

26. The apparatus of claim 22, wherein the instructions are further executable by the processor to cause the apparatus to:

determine whether a difference between an end of one or more first channels associated with the first priority of service and a beginning of one or more second channels associated with the second priority of service satisfies a threshold of transmission time intervals;

process, based at least in part on determining whether the difference satisfies the threshold of transmission time intervals, the one or more second channels associated with the second priority of service; and determine, based at least in part on determining whether the difference satisfies the threshold of transmission time intervals, whether to process the one or more first channels associated with the first priority of service.

27. The apparatus of claim 26, wherein the threshold of transmission time intervals is based at least in part on a minimum processing time for the one or more first channels associated with the first priority of service.

28. The apparatus of claim 15, wherein the instructions to receive the configuration further are executable by the processor to cause the apparatus to:
receive one or more first channels associated with the first priority of service;
receive one or more second channels associated with the second priority of service; and
process the one or more second channels associated with the second priority of service prior to the one or more first channels associated with the first priority of service, wherein the second priority of service has a higher priority than the first priority of service.

29. An apparatus for wireless communication at a user equipment (UE), comprising:
means for identifying one or more frequency bands, a frequency band of the one or more frequency bands comprising a plurality of component carriers associated with a serving cell, the plurality of component carriers comprising a first quantity of component carriers for a first priority of service and a second quantity of component carriers for a second priority of service, wherein the first priority of service is different from the second priority of service;
means for determining whether the UE is configured with a first capability to support the first quantity of component carriers in the frequency band, a second capability to support the second quantity of component carriers in the frequency band, and a third capability to process one or more channels associated with the first priority of service and the second priority of service on a component carrier of the plurality of component carriers;
means for transmitting, to a base station based at least in part on the determining, a capability report comprising the first capability to support the first quantity of component carriers for the first priority of service, the second capability to support the second quantity of component carriers for the second priority of service, and the third capability to process the one or more channels associated with the first priority of service and the second priority of service on the component carrier; and
means for receiving, from the base station based at least in part on transmitting the capability report, a configuration for processing the one or more channels associated with the first priority of service and the second priority of service on the component carrier of the plurality of component carriers.

30. A non-transitory computer-readable medium storing code for wireless communication at a user equipment (UE), the code comprising instructions executable by a processor to:
identify one or more frequency bands, a frequency band of the one or more frequency bands comprising a plurality of component carriers associated with a serving cell, the plurality of component carriers comprising a first quantity of component carriers for a first priority of service and a second quantity of component carriers for a second priority of service, wherein the first priority of service is different from the second priority of service;
determine whether the UE is configured with a first capability to support the first quantity of component carriers in the frequency band, a second capability to support the second quantity of component carriers in the frequency band, and a third capability to process one or more channels associated with the first priority of service and the second priority of service on a component carrier of the plurality of component carriers;
transmit, to a base station based at least in part on the determining, a capability report comprising the first capability to support the first quantity of component carriers for the first priority of service, the second capability to support the second quantity of component carriers the second priority of service, and the third capability to process the one or more channels associated with the first priority of service and the second priority of service on the component carrier; and
receive, from the base station based at least in part on transmitting the capability report, a configuration for processing the one or more channels associated with the first priority of service and the second priority of service on the component carrier of the plurality of component carriers.

* * * * *